Jan. 7, 1930.  C. N. CORYELL  1,742,342
COMPACT PAN FOR VANITY CASES
Filed Jan. 25, 1929   2 Sheets-Sheet 1
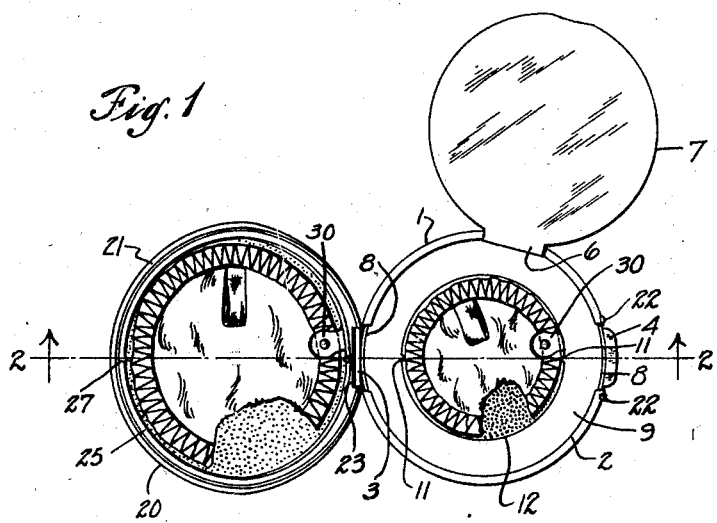
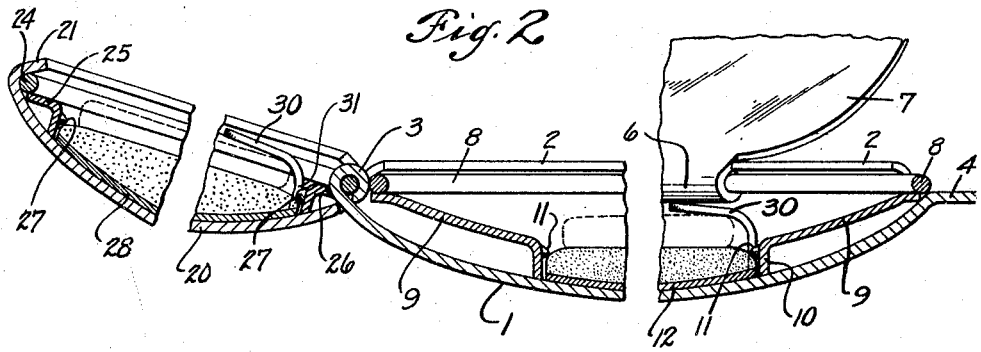
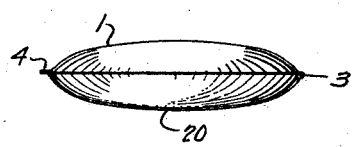
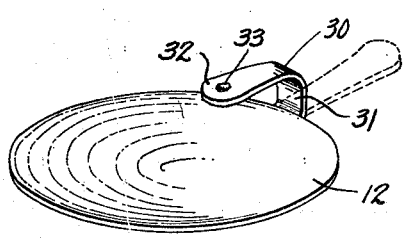
INVENTOR.
Charles N. Coryell
BY Albert M. Austin
ATTORNEY Jan. 7, 1930. C. N. CORYELL 1,742,342
COMPACT PAN FOR VANITY CASES
Filed Jan. 25, 1929 2 Sheets-Sheet 2

INVENTOR.
Charles N. Coryell
BY Albert M. Austin
ATTORNEY.

Patented Jan. 7, 1930

1,742,342

UNITED STATES PATENT OFFICE

CHARLES N. CORYELL, OF MAMARONECK, NEW YORK, ASSIGNOR TO EDWARD M. DALLEY, OF LARCHMONT, NEW YORK

COMPACT PAN FOR VANITY CASES

Application filed January 25, 1929. Serial No. 335,010.

The invention relates in general to vanity cases, and more particularly, to a novel type of compact pan for a vanity case.

According to the invention a vanity case is provided which may be of the single or double compact type having a compact pan for holding the compact powder. The pan is provided with an inwardly extending finger or projection at its edge which affords a convenient means for holding a powder puff in position and also assists in removing the compact from the case when desired. The invention is applicable to any shape of compact case, whether convex, flat or straight sided.

The invention also consists in certain new and original features of construction and combinations of parts hereinafter set forth and claimed.

Although the novel features which are believed to be charactertistic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a plan view of the vanity case in open position;

Fig. 2 is a section on the line 2—2 of Fig. 1;

Fig. 3 is a side elevation of the case in closed position;

Fig. 4 is a perspective of the compact pan shown removed from the vanity case;

Like reference characters denote like parts in the several figures of the drawings.

Figure 5:
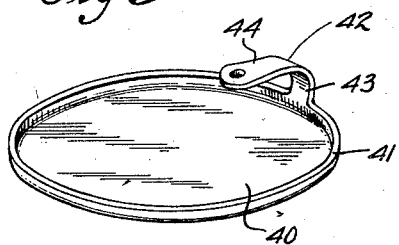
Fig. 5 is a perspective view of a different form of compact pan having the invention applied thereto.

In the following description and in the claims parts will be identified by specific names for convenience, but they are intended to be as generic in their application to similar parts as the art will permit.

Referring to the drawing, a well known form of vanity case is illustrated with the compact in position therein for the purpose of illustrating the invention. It will be understood, however, that the invention may be applied to other shapes of compact pans fitting in other well known types of vanity cases.

The vanity case illustrated comprises a convex cover 1 having a turned-in annular edge 2. At one point a portion of the edge is curved to form a hinge knuckle 3 for hinging the other cover. At an opposite point a part of the edge is bent outwardly to form a finger piece 4. At a point between the hinge knuckle and finger piece the edge is provided with a cut away portion 5 for the reception of the hinge knuckle 6 of the mirror 7.

The mirror section comprises a sheet metal mirror polished at both sides having an integral hinge knuckle 6 fitting in a recess through which an annular wire 8 is passed forming a pintle for the hinge. This wire is sprung under or otherwise held in the inturned edge 2.

A bezel ring 9 is also positioned under the inturned edge, this bezel ring being generally flat but having a depending inner flange 10. This flange 10 is provided with pressed out nibs 11 for detachably holding a sheet metal compact pan 12 in which the cosmetic is pressed, the cosmetic in this cover being preferably rouge.

The other cover 20 is convex and has an inturned edge 21 which is slightly larger than the first cover 1 and the first cover fits entirely within the second cover when the vanity case is closed, as illustrated in Fig. 3. The first cover 1 is provided with struck-out nibs 22 at its edge to engage under the inturned flange 21 of the second cover and to act as a catch.

The second cover 20 is provided with a cutaway portion 23 for seating the hinge knuckle 3 of the first cover and a wire ring 24 is sprung or otherwise held in the inturned flange 21, this wire ring passing through the hinge knuckle 3 and forming a pintle for the hinge. A bezel ring 25 is provided, this ring being held under the inturned flange 21 and provided with a recess 26 to clear the hinge knuckle 3. This bezel ring is provided with nibs 27 for detachably holding a compact pan 28 in place. This compact pan 28 is convex to fit the cover and is preferably filled with compacted powder.

Each of the compact pans is made of sheet material and has projecting from the edge thereof a finger 30, which may be integrally formed therewith, or securely attached thereto in any convenient manner. Since the compact pans are alike except for size, but one will be described in detail.

The finger has a reduced shank or neck 31 immediately adjoining the compact pan body, and the end 32 of the finger is enlarged. The end of the finger may also be provided with an opening 33 in which a tool may be inserted for removing the compact if desired.

It will be understood that when the powder or other cosmetic is being compressed in the pan the finger extends outwardly and that after the cosmetic is compressed on the pan the finger is bent inwardly to the position shown. The neck or shank 31 permits easy bending at this point without also bending the compact pan and thereby avoiding possible breaking of the relatively fragile compact cake. The finger thus provides two functions, (1) to hold the powder puff in position and to prevent accidental dropping from the vanity case and (2) to provide means for easily removing the compact therefrom either by grasping with the fingers or by means of a tool inserted under the finger 30 or through the hole 33 therein.

In Fig. 5 the pan is shown as having a flat bottom 40 and straight sides 41. In this construction the finger 42 projects from the top of the straight sides and is provided with a reduced neck or shank 43 and an enlarged head 44 for the purpose described above.

Figure 6:
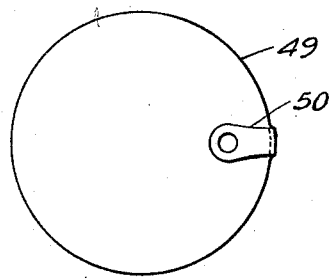
Fig. 6 is a plan view of a third form of compact pan.
Figure 7:
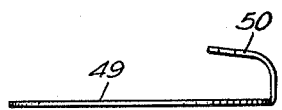
Fig. 7 is an elevation of the pan shown in Fig. 6.

In Figs. 6 and 7 a flat compact pan 49 is shown in which construction the finger 50, which is of the same shape as the fingers above described, is integrally connected to the edge of the flat pan.

Figure 8:
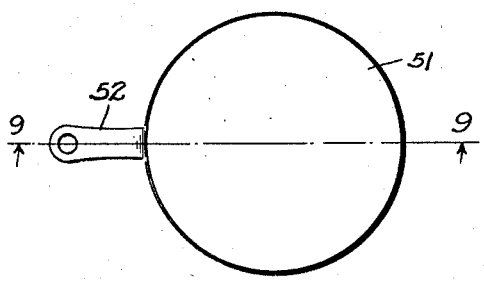
Fig. 8 illustrates a modified form of compact pan having a short finger projecting outwardly instead of inwardly.
Figure 9:
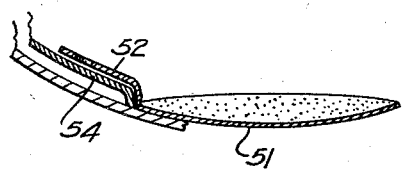
Fig. 9 is a section taken on the line 9—9 of Fig. 8 showing the pan in position in a vanity case.

Referring now to Figs. 8 and 9, the pan 51 is shown as provided with a short projection 52, similar to projection 30 above described, extending outwardly and overlying the bezel ring 54 of a vanity case. It will be seen that this projection provides a convenient means for the insertion of a tool or the finger nail to remove the pan from the case in constructions where the puff holding feature is not desired.

The projecting finger not only does not interfere with the usual compacting operation, but on the contrary is advantageous in providing a handle for handling the compact member before and after the compacting operation.

Thus a number of compact pans have been disclosed having means attached thereto for both holding the powder puff and also for affording easy removal of the pan from the vanity case. The invention is adaptable to any kind of compact pan fitting any shape of vanity case, and obviates all necessity of providing projections or fingers extending from the bezel ring, or providing recesses or more complicated means to aid in removing the compacts from the case. The finger is stamped from the sheet material from which the pan is made and extends outwardly therefrom during the usual pressure operation for affixing the compacted cosmetic to the pan, whereby interference with the usual compacting operation is avoided.

In positioning the compact pan in the case the finger should preferably be placed directly over one of the nibs so that, when lifting up the finger to remove the pan, the hole is directly over the nib, thereby facilitating removal of the pan from the vanity case.

It may be desirable to form both the pan and the finger of the same material, such as aluminum, in which case the finger can be integrally formed on the pan. In other instances it may be desirable to form the finger of a different material, such as brass, in order to limit the possibility of breaking. It may then be secured to the pan as desired or may lie under the pan in frictional engagement therewith. The drawing is merely illustrative and not intended as a limitation.

What is claimed is:

1. In a vanity case, a cover, a sheet metal compact pan in said cover, means holding said pan in said cover, a cosmetic cake in said pan, said pan having a finger secured thereto and bent in from its edge, said finger being adapted to have a powder puff seated thereunder and to assist in holding said powder puff in place on said cosmetic, said finger also providing means by which said pan may readily be removed from said cover.

2. In a vanity case, a cover, a pan in said cover, means holding said pan in said cover, cosmetic in said pan, a projection extending towards the center of said pan from its edge and secured directly to said pan, said projection being adapted to have a powder puff seated thereunder to assist in holding said powder puff in place on said cosmetic, said projection also providing means by which said pan may readily be removed from said cover.

3. In a vanity case, a cover, a pan in said cover, means detachably holding said pan in said cover, cosmetic in said pan, a member projecting from the edge of said pan and having an aperture therein for the insertion of a tool to assist in removing said pan from said cover.

4. In a compact for a vanity case, a pan comprising a pan body and a member secured thereto and projecting from an edge thereof inwardly over the pan body, a cosmetic cake on said pan body, said member being for the purpose of holding a cosmetic dispensing member in place on said cosmetic cake.

5. In a compact for a vanity case, a pan comprising a pan body made of sheet material having a finger directly secured thereto and projecting from an edge thereof over the pan body, a cosmetic cake on said pan body, said finger being comparatively easy to bend so that said finger may be bent inwardly over the pan body after the cosmetic cake is applied to said body without damaging the cake, said finger assisting in holding a powder puff over said compact and in removing the compact pan from the vanity case.

6. In a compact for a vanity case, a pan comprising a pan body made of sheet material having an integral finger projecting from an edge thereof, a cosmetic cake on said pan body, said finger having a reduced neck and an enlarged head, said neck being comparatively easy to bend so that said finger may be bent inwardly over the pan body after the cosmetic cake is applied to said body without damaging the cake, said head having a hole for the insertion of an implement to assist in removing the compact pan from the vanity case.

In testimony whereof I have hereunto set my hand and seal.

CHARLES N. CORYELL